United States Patent
Suzuki et al.

(10) Patent No.: US 10,547,210 B2
(45) Date of Patent: Jan. 28, 2020

(54) WIRELESS POWER TRANSMISSION SYSTEM

(71) Applicant: KABUSHIKI KAISHA TOSHIBA, Tokyo (JP)

(72) Inventors: Masatoshi Suzuki, Shizuoka (JP); Hiroaki Ishihara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 20 days.

(21) Appl. No.: 15/705,370

(22) Filed: Sep. 15, 2017

(65) Prior Publication Data

US 2018/0138750 A1 May 17, 2018

(30) Foreign Application Priority Data

Nov. 14, 2016 (JP) .................................. 2016-221510
Sep. 14, 2017 (JP) .................................. 2017-176546

(51) Int. Cl.
*H02J 50/12* (2016.01)
*H02J 50/70* (2016.01)
*H02J 7/02* (2016.01)

(52) U.S. Cl.
CPC .............. *H02J 50/12* (2016.02); *H02J 7/025* (2013.01); *H02J 50/70* (2016.02)

(58) Field of Classification Search
CPC ............ H02J 50/12; H02J 50/70; H02J 7/025
USPC ........................................................ 307/104
See application file for complete search history.

(56) References Cited

U.S. PATENT DOCUMENTS

| 2011/0127845 | A1* | 6/2011 | Walley | H02J 5/005 307/104 |
| 2012/0306284 | A1* | 12/2012 | Lee | H02J 17/00 307/104 |
| 2012/0313449 | A1* | 12/2012 | Kurs | B60L 53/51 307/104 |
| 2012/0315844 | A1* | 12/2012 | Cox | H04B 5/0031 455/41.1 |
| 2014/0015329 | A1* | 1/2014 | Widmer | G01D 5/2006 307/104 |
| 2016/0221461 | A1 | 8/2016 | Obayashi et al. | |
| 2016/0315383 | A1 | 10/2016 | Akuzawa et al. | |
| 2017/0106767 | A1* | 4/2017 | Tajima | B60L 5/36 |

FOREIGN PATENT DOCUMENTS

| JP | 2015-077027 | 4/2015 |
| WO | WO 2015/097806 | 7/2015 |

* cited by examiner

*Primary Examiner* — Daniel Kessie
*Assistant Examiner* — Swarna N Chowdhuri
(74) *Attorney, Agent, or Firm* — Finnegan, Henderson, Farabow, Garrett & Dunner, L.L.P.

(57) ABSTRACT

According to one embodiment, a wireless power transmission system includes: a power transmission device and a power reception device. The power transmission device includes an AC power generation circuit; first circuits connected to the AC power generation circuit; and power transmission resonators. The power reception device includes: power reception resonators, second circuits each connected to different one of the plurality of power reception resonators and a rectifier circuit. An absolute value of an open-circuit output reverse voltage gain in an F matrix of each of the plurality of first circuits is less than 1, and an absolute value of a short-circuit output reverse current gain in an F matrix of each of the plurality of second circuits is less than 1.

9 Claims, 11 Drawing Sheets

LOW-PASS FILTER

HIGH-PASS FILTER

WIRELESS POWER TRANSMISSION SYSTEM

CROSS REFERENCE TO RELATED APPLICATION

This application is based upon and claims the benefit of priority from the prior Japanese Patent Application No. 2016-221510, filed on Nov. 14, 2016 and No. 2017-176546, filed on Sep. 14, 2017, the entire contents of which are incorporated herein by reference.

FIELD

Embodiments described herein relate to a wireless power transmission system.

BACKGROUND

A wireless power transmission system wirelessly transmits power from a power transmission device to a power reception device. The power transmission device includes: a commercial AC power supply; an AC/DC converter that converts AC power to DC power; a DC/DC converter that converts an output voltage of the AC/DC converter to an arbitrary voltage; an inverter that generates high frequency power from output power of the DC/DC converter; and a resonator (power transmission resonator) that generates a magnetic field according to the high frequency power. The power transmission resonator includes a coil and a capacitor. The high frequency power includes a resonant frequency of the power transmission resonator. This realizes efficient transmission. The power reception device includes: a resonator (power reception resonator) that receives power through the magnetic field transmitted from the power transmission resonator; a rectifier that converts the AC power obtained by the power reception resonator to DC power; and a DC/DC converter that converts an output voltage of the rectifier to a voltage according to a battery. A pair of the power transmission resonator and the power reception resonator will be referred to as a resonator pair. The power reception device is connected to the battery, and the output voltage of the DC/DC converter is supplied to the battery. In the wireless power transmission system, the power is propagated through the magnetic field radiated into a space, from the power transmission resonator toward the power reception resonator. Strength of the radiation magnetic field (leakage magnetic field) needs to be equal to or smaller than a value compliant with laws and regulations represented by the Radio Act.

An example of a known technique for satisfying the requirement includes a technique of using a plurality of power transmission systems and a plurality of power reception systems to adjust a phase relationship between currents of the power transmission systems to cancel out, at an arbitrary distant place, magnetic fields radiated from the plurality of power transmission systems. However, when there is a difference between coupling coefficients of the resonator pairs, amplitudes of the currents of the power transmission resonators vary, and the radiation magnetic fields cannot be canceled out. To improve this, the output voltages in the DC/DC converters of the transmission systems and the output voltages of the rectifiers in the power reception systems need to be changed according to the coupling coefficients. However, this complicates the process, and there is a problem that a convergence of control is reduced.

DETAILED DESCRIPTION

According to one embodiment, a wireless power transmission system includes: a power transmission device and a power reception device.

The power transmission device includes: an AC power-generation circuit configured to generate AC power; a plurality of first circuits connected to the AC power generation circuit; and a plurality of power transmission resonators each connected to different one of the plurality of first circuits, the plurality of power transmission resonators configured to generate magnetic fields according to the AC power received through the plurality of first circuits.

The power reception device includes: a plurality of power reception resonators configured to receive the AC power through magnetic field coupling to the plurality of power transmission resonators; a plurality of second circuits each connected to different one of the plurality of power reception resonators; and a rectifier circuit connected to the plurality of second circuits and configured to convert voltages of the AC power received through the plurality of second circuits to DC voltages.

An absolute value of an open-circuit output reverse voltage gain in an F matrix of each of the plurality of first circuits is less than 1. An absolute value of a short-circuit output reverse current gain in an F matrix of each of the plurality of second circuits is less than 1.

Embodiments of the present invention will now be described with reference to the drawings.

Figure 1:
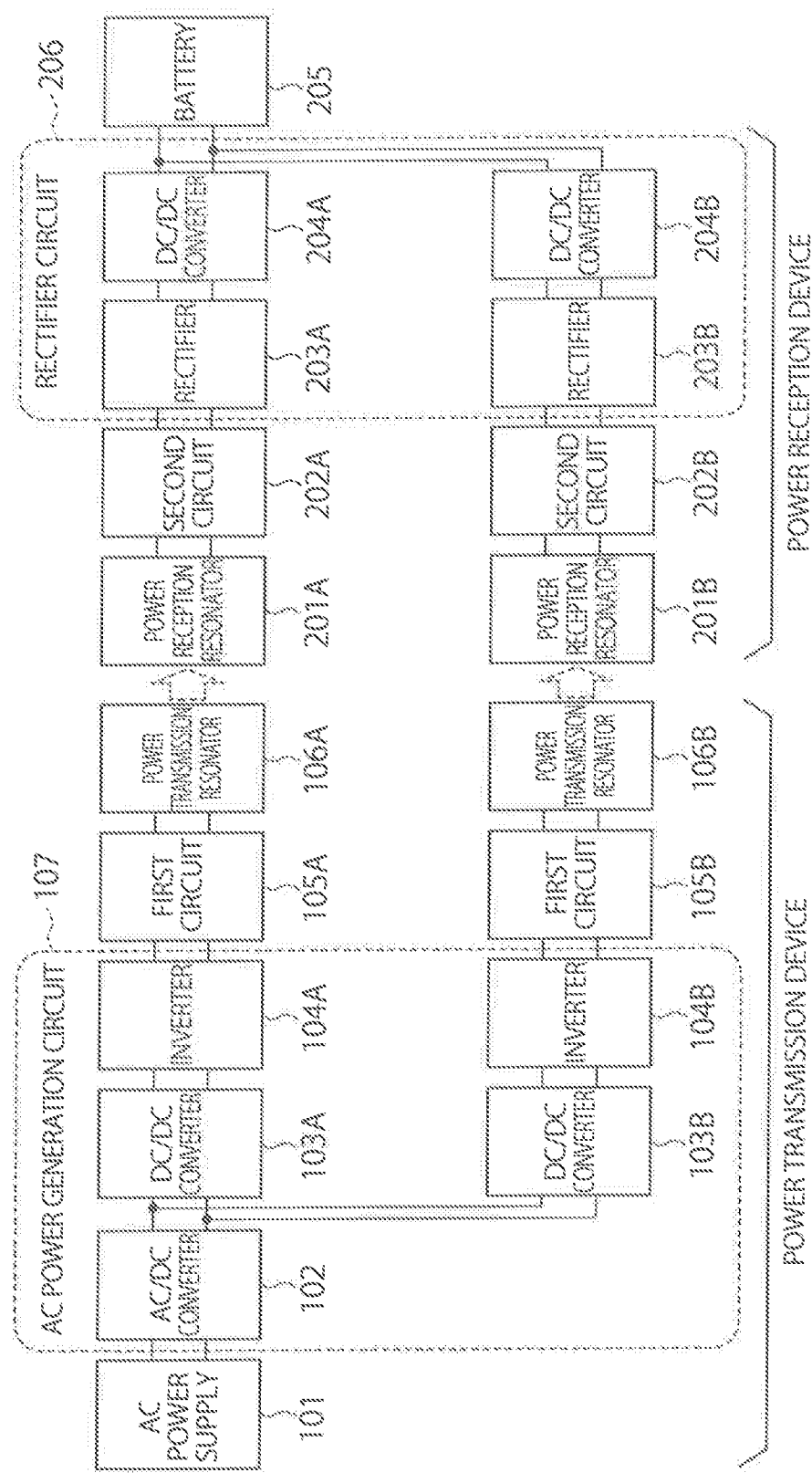
FIG. 1 is a diagram showing an overall configuration of a wireless power transmission system according to a first embodiment.

FIG. 1 shows an overall configuration of a wireless power transmission system according to the present embodiment. The present system includes: a power transmission device that wirelessly transmits high frequency power; a power reception device that receives the high frequency power from the power transmission device; and a battery. The present system charges the battery with the power transmitted from the power transmission device to the power reception device.

The power transmission device includes an AC power supply 101, an AC/DC converter (AC/DC voltage converter) 102, and a plurality of power transmission systems (two systems in the example of FIG. 1). One of the power transmission systems (referred to as a power transmission system A) includes a DC/DC converter (DC/DC voltage converter) 103A, an inverter 104A, a first circuit 105A, and a power transmission resonator 106A. The other power transmission system (referred to as a power transmission system B) includes a DC/DC converter (DC/DC voltage converter) 103B, an inverter 104B, a first circuit 105B, and a power transmission resonator 106B. A set of the AC/DC converter 102, the DC/DC converters 103A and 103B, and the inverters 104A and 104B corresponds to an AC power generation circuit 107. An input side of the AC power generation circuit 107 is connected to the AC power supply 101, and an output side is connected to the first circuits 105A and 105B.

The AC power supply 101 supplies AC power (AC voltage and AC current) at a constant frequency. An example of the AC power supply 101 includes a commercial power supply. The commercial power supply is, for example, a device that outputs an AC voltage of single-phase 100V or 3-phase 200V with a frequency of 50 Hz or 60 Hz. The AC power supply 101 can be an arbitrary power supply.

The AC/DC converter 102 is a circuit connected to the AC power supply 101 through wiring (such as a cable) and configured to convert the voltage of the AC power supplied from the AC power supply 101 to a DC voltage.

The DC/DC converters 103A and 103B are circuits connected to the AC/DC converter 102 through wiring and configured to convert (step up or step down) the DC voltage supplied from the AC/DC converter 102 to a different DC voltage. The DC/DC converters 103A and 103B include switching elements, such as semiconductor switches, and cause the switching elements to operate at a constant operation frequency to perform the DC/DC conversion. Step-up ratios or step-down ratios (hereinafter; referred to as step-up/step-down ratios) of the DC/DC converters 103A and 103B may be able to be individually controlled. Here, the step-up/step-down ratios of the DC/DC converters 103A and 103B are the same. The fact that the step-up/step-down ratios are the same denotes that the DC/DC converters 103A and 103B output voltages at the same or substantially the same amplitude.

The inverters 104A and 104B are circuits connected to the DC/DC converters 103A and 103B through wiring and configured to generate AC power (AC current and AC voltage) based on the DC voltage supplied from the DC/DC converters 103A and 103B. Here, higher frequency power is generated as the AC power. The inverters 104A and 104B are configured to generate currents with a phase difference of 180 degrees (reverse phase). Therefore, the inverters 104A and 104B are driven in reverse phase. The reason that the phase is reversed is to cancel out, at a distant place, magnetic fields radiated from the power transmission resonators 106A and 106B to eliminate or reduce a leakage magnetic field. The phase difference may not be 180 degrees in order to obtain the cancellation effect of the magnetic fields, and for example, a desired level of reduction effect may be obtained by providing a phase difference in a range of 180 degrees plus or minus α.

The first circuits 105A and 105B are connected to the AC power generation circuit 107. More specifically, the first circuit 105A is connected to the inverter 104A through wiring, and the first circuit 105B is connected to the inverter 104B through wiring. Therefore, each of the first circuits 105A and 105B is connected to different one of the inverters 104A and 104B through wiring. Each of the first circuits 105A and 105B is a circuit in which an absolute value of an open-circuit output reverse voltage gain A in an F matrix is less than 1. The first circuits 105A and 105B are configured by a plurality of elements (coils, capacitors, and the like), and constants (inductances, capacitances, and the like) of the elements are set to satisfy the condition that the open-circuit output reverse voltage gain A is less than 1. "A" is set to 0 in the case illustrated in the present example. The reason that the value of "A" is set in this way will be described later. Configurations of the first circuits 105A and 105B are not limited to specific configurations and can be arbitrary.

Here, the F matrix is a matrix storing four parameters "A", "B", "C", and "D" in respective elements as follows.

(Expression 1)

$$\begin{bmatrix} A & B \\ C & D \end{bmatrix} \quad \text{Formula (A)}$$

"A" is an open-circuit output reverse voltage gain.
"B" is a short-circuit output transfer impedance.
"C" is an open output transfer admittance.
"D" is a short-circuit output reverse current gain.

Figure 2:
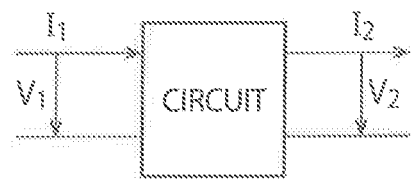
FIG. 2 is a diagram describing parameters "A" to "D" of an F matrix.

FIG. 2 is a diagram describing the parameters "A" to "D". An input current and an input voltage of the circuit will be referred to as "$I_1$" and "$V_1$", and an output current and an output voltage will be referred to as "$I_2$" and "$V_2$". In this case, the parameters "A" to "D" are expressed as follows.

(Expression 2)

$$A = \frac{V_1}{V_2}\bigg|_{I_2=0}$$

$$B = \frac{V_1}{I_2}\bigg|_{V_2=0}$$

$$C = \frac{I_1}{V_2}\bigg|_{I_2=0}$$

$$D = \frac{I_1}{I_2}\bigg|_{V_2=0}$$

The following formula holds.

(Expression 3)

$$\begin{bmatrix} V_1 \\ I_1 \end{bmatrix} = \begin{bmatrix} A & B \\ C & D \end{bmatrix} \begin{bmatrix} V_2 \\ I_2 \end{bmatrix} \quad \text{Formula (B)}$$

In both the first circuits 105A and 105B, "B", "C" and "D" in the F matrix are not limited to specific values or specific ranges. The absolute value of "A" is preferably 0.5 or less, more preferably 0.1 or less, and most preferably 0. The values of "A" are the same in the first circuits 105A and 105B. However, the values are not limited to this, and the values of "A" may be different in the first circuit 105A and the first circuit 105B.

Figure 3A:
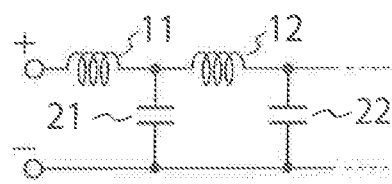
FIG. 3A and FIG. 3B each is a diagram showing a configuration example of a first circuit and a second circuit.
Figure 3B:
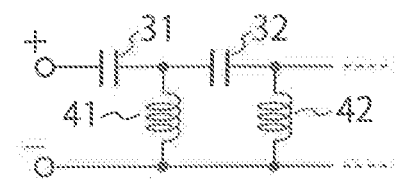

FIG. 3(A) shows a configuration example of the first circuits 105A and 105B. FIG. 3(B) shows another configuration example of the first circuits 105A and 105B. Although the first circuits 105A and 105B have the same configuration here, the configuration may not be the same as long as the conditions regarding the value of the parameter "A" are satisfied.

In the configuration of FIG. 3(A), a plurality of coils 11, 12, . . . that are inductive elements are connected in series to a positive terminal. One end of each of capacitors 21, 22, . . . that are capacitive elements is connected between adjacent coils. The other ends of the capacitors 21, 22, . . . are connected to a negative terminal. Therefore, the configuration of FIG. 3(A) indicates a ladder circuit, and this is equivalent to a configuration of a low-pass filter.

In the configuration of FIG. 3(B), a plurality of capacitors 31, 32, . . . that are capacitive elements are connected in series to a positive terminal. One end of each of coils 41, 42, . . . that are inductive elements is connected between adjacent capacitors. The other ends of the coils 41, 42, . . . are connected to a negative terminal. Therefore, the configuration of FIG. 3(B) indicates a ladder circuit, and this is equivalent to a configuration of a high-pass filter.

Each of the power transmission resonators 106A and 106B is connected to different one of the first circuits 105A and 105B through wiring. Specifically, the power transmission resonator 106A is connected to the first circuit 105A, and the power transmission resonator 106B is connected to the first circuit 105B. Each of the power transmission resonators 106A and 106B includes coils and capacitors. The power transmission resonators 105A and 105B receive high frequency power (high frequency current) from the inverters 104A and 105B through the first circuits 105A and 105B and generate magnetic fields according to the high frequency power. The magnetic fields are coupled to the power reception resonators 106A and 106B of the power reception device to perform wireless power transmission. For example, the frequency of the wirelessly transmitted power is the same or close to a resonant frequency of the power transmission resonators 106A and 106B. This can increase power transmission efficiency.

Figures 4A, 4B, 4C:
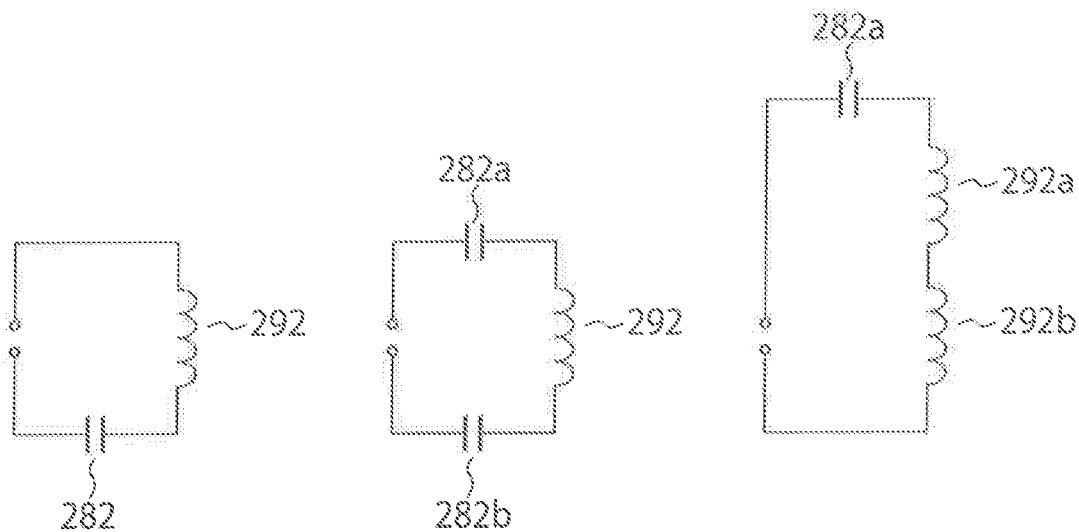
FIG. 4A, FIG. 4B and FIG. 4C each is a diagram showing a configuration example of a power transmission resonator and a power reception resonator.

FIGS. 4(A) to 4(C) show configuration examples of the power transmission resonators 106A and 106B. Although the configurations of the power transmission resonators 106A and 106B are the same here, the configurations may be different. In the configuration of FIG. 4(A), a capacitor (capacitance) 282 is connected in series to one end of a coil (inductor) 292. The capacitance 282 may be connected in series to the side opposite the side in FIG. 4(A), that is, to the other end of the coil 292. Capacitances 282a and 282b may be connected to both sides of the coil 292 as shown in FIG. 4(B), or a plurality of coils 292a and 292b and the capacitance 282a may be connected in series as shown in FIG. 4(C). The coils 292, 292a, and 292b may be wound on magnetic cores. Coils with arbitrary winding may be used, such as spiral coils and solenoid coils. Configurations other than the configurations shown in FIGS. 4(A) to 4(C) are also possible.

The power reception device includes a plurality of reception systems (two systems in the example of FIG. 1). Outputs of the two reception systems are connected to a battery 205. One of the reception systems (referred to as a power reception system A) includes a power reception resonator 201A, a second circuit 202A, a rectifier 203A, and a DC/DC converter 204A. The other reception system (referred to as a power reception system B) includes a power reception resonator 201B, a second circuit 202B, a rectifier 203B, and a DC/DC converter 204B. A set of the rectifiers 203A and 203B and the DC/DC converter 204A configures a rectifier circuit 206. An input side of the rectifier circuit 206 is connected to the second circuits 202A and 202B, and an output side is connected to the battery 205.

The power reception resonator 201A is coupled to the power transmission resonator 106A through a magnetic field to receive AC power (AC voltage and AC current). Here, high frequency power is received as the AC power. A coupling coefficient between the power reception resonator 201A and the power transmission resonator 106A will be referred to as "k1". The power reception resonator 201B is coupled to the power transmission resonator 106B through a magnetic field to receive AC power (AC voltage and AC current). A coupling coefficient between the power reception resonator 201B and the power transmission resonator 106B will be referred to as "k2".

The power reception resonators 201A and 201B include coils and capacitors. A resonant frequency of the power reception resonators 201A and 201B is, for example, the same or close to a frequency of the received AC power. Configuration examples of the power reception resonators 201A and 201B include the configurations of FIGS. 4(A) to 4(C) as in the power transmission resonators 106A and 106B.

An arrangement relationship between the power transmission resonator 106A and the power reception resonator 201A and an arrangement relationship between the power transmission resonator 106B and the power reception resonator 201B may be arbitrary as long as magnetic coupling is possible through a space.

Each of the second circuits 202A and 202B is connected to different one of the power reception resonators 201A and 201B through wiring. Specifically, the second circuit 202A is connected to the power reception resonator 201A, and the second circuit 202B is connected to the power reception resonator 201B. The second circuits 202A and 202B are circuits in which the absolute value of the short-circuit output reverse current gain D in the F matrix shown in formula (A) is less than 1. The second circuits 202A and 202B include a plurality of elements (coils, capacitors, and the like), and constants (inductances, capacitances, and the like) of the elements are set to satisfy the condition that the open-circuit output reverse voltage gain D is less than 1. The value of "D" is 0 in the present example. The reason that the value of "D" is set in this way will be described later. Configurations of the second circuits 202A and 202B may be arbitrary. Configuration examples of the second circuits 202A and 202B include the configurations of FIGS. 3(A) and 3(B) as in the first circuits 105A and 105B on the power transmission side.

In the second circuits 202A and 202B, "A", "B", and "C" in the F matrix are not limited to specific values or specific ranges. The absolute value of "D" is preferably 0.5 or less, more preferably 0.1 or less, and most preferably 0. The value of "D" of the second circuit 202A and the value of "D" of the second circuit 202B may be different. Here, the values of "D" are 0 in both the second circuits 202A and 202B.

The rectifiers 203A and 203B are connected to the second circuits 202A and 202B through wiring. The rectifiers 203A and 203B are circuits that receive AC power from the power reception resonators 201A and 201B through the second circuits 202A and 202B to convert the voltage of the AC power to a DC voltage.

The DC/DC converters 204A and 204B are circuits connected to the rectifiers 203A and 203B through wiring and configured to convert a constant DC voltage output from the rectifier 203 to a voltage that can be used by the battery 205 (voltage higher than, the same as, or lower than the constant DC voltage) and output the voltage. The battery 205 is connected to a later stage of the DC/DC converter 204 through wiring. Step-up/step-down ratios of the DC/DC converters 204A and 204B may be able to be individually controlled.

The battery 205 is a device that stores power input from the DC/DC converters 204A and 204B. A resistor (such as a motor) that consumes power may be used in place of the battery 205. The resistor and the battery may be collectively called a loading device.

As described, the absolute value of the value of "A" in the F matrix of each of the first circuits 105A and 105B is less than 1 and is 0 in the present example. The absolute value of "D" in the F matrix of each of the second circuits 202A and 202B is less than 1 and is 0 in the present example. When the conditions that "A" and "D" are 0 are satisfied, the absolute values of the currents of the power transmission resonator 106A and the power reception resonator 201A do not depend on the coupling coefficient k1 between the power transmission resonator 106A and the power reception resonator 201A, and the absolute values of the currents of the power transmission resonator 106B and the power reception resonator 201B do not depend on the coupling coefficient k1 between the power transmission resonator 106A and the power reception resonator 201A (details will be described later). Therefore, the step-up/step-down ratios of the inverters 104A and 104B of the two power transmission systems can be set to the same value (output voltages of the inverters 104A and 104B can be set to the same value), and the step-up/step-down ratios of the rectifiers 203A and 203B of the two power reception systems can be set to the same value. In this way, the current flowing through the power transmission resonator and the power reception resonator in the systems A (power transmission system A and power reception system A) can be equal to the current flowing through the power transmission resonator and the power reception resonator in the systems B (power transmission system B and power reception system B). As a result, the control of charging is significantly simplified.

If the value of "A" in the F matrix of each of the first circuits 105A and 105B is less than 1, and the value of "D" In the F matrix of each of the second circuits 202A and 202B is less than the absolute values of the currents of the power transmission resonator 106A and the power reception resonator 201A can be less dependent on the coupling coefficient k1, and the absolute values of the currents of the power transmission resonator 106B and the power reception resonator 201B can be less dependent on the coupling coefficient k2. The closer the values of "A" and "D" to 0, the greater the advantageous effect. Therefore, regardless of the difference between the coupling coefficients k1 and k2, the current flowing through the power transmission resonator and the power reception resonator in the system A (power transmission system A and power reception system A) and the current flowing through the power transmission resonator and the power reception resonator in the system B (power transmission system B and power reception system B) can be the same or close to each other with a simple configuration. Since the dependence on the coupling coefficients k1 and k2 can be reduced, the control is also simplified when the step-up/step-down ratios of the DC/DC converters 103A and 103B and the DC/DC converters 204A and 204B are individually controlled.

The reason that the advantageous effect can be obtained by setting the absolute value of the value of "A" In the F matrix of each of the first circuits 105A and 105B to less than 1 or 0 and setting the absolute value of "D" in the F matrix of each of the second circuits 202A and 202B to less than 1 or 0 will be described.

As described, the inverters of the two power transmission systems are driven in reverse phase to cancel out the magnetic fields at an arbitrary distant place in the wireless power transmission system according to the present embodiment. To cancel out the magnetic fields at a distant place, it is required that a sum $i_{trx1}$ of a power transmission resonator current $i_{tx1}$ of one of the power transmission systems and a power reception resonator current $i_{rx1}$ of one of the power reception systems corresponding to the one of the power transmission system be equal to a sum $i_{trx2}$ of a power transmission resonator current $i_{tx2}$ of the other power transmission system and a power reception resonator current $i_{rx2}$ of the other power reception system corresponding to the other power transmission system. The following formulas express the relationship.

$$i_{trx1} = i_{tx1} + i_{rx1} \quad (1)$$

$$i_{trx2} = i_{tx2} + i_{rx2} \quad (2)$$

$$\Delta i_{trx} = |i_{trx1}| - |i_{trx2}| \quad (3)$$

Figure 5A:
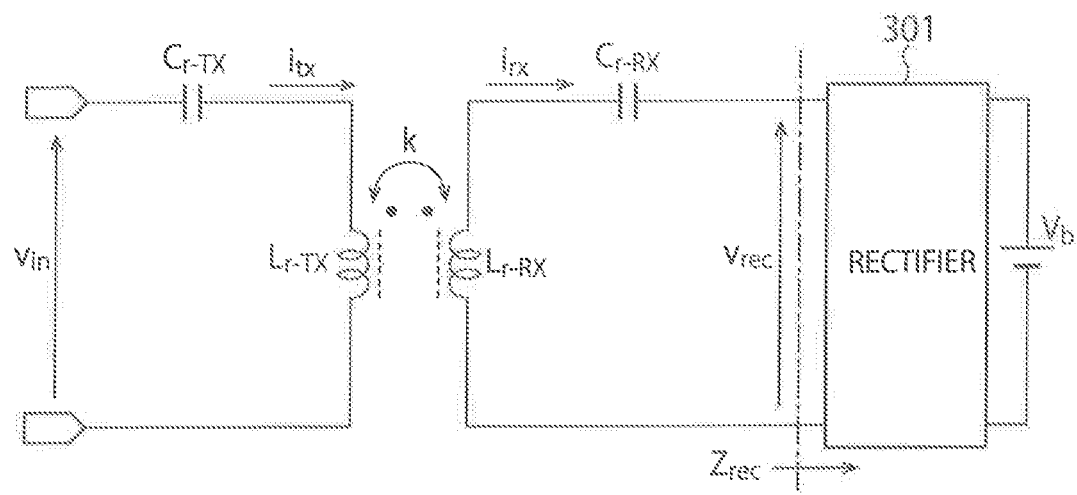
FIG. 5A and FIG. 5B each is a block diagram of a power transmission resonator and a power reception device in a basic wireless power transmission system.

FIG. 5(A) shows a block diagram of a power transmission resonator and a power reception device in a basic wireless power transmission system. The system is a single system (one power transmission system and one power reception system).

Here, "$L_{r-TX}$" and "$C_{r-TX}$" on a power transmission side (primary side) form the power transmission resonator. A resonant frequency $f_0$ of the resonator is equal to the frequency of the input AC voltage. "$L_{r-TX}$" and "$C_{r-TX}$" on a power reception side (secondary side) are the power reception resonator that also resonates at the resonant frequency $f_0$. "$V_B$" shows a battery (storage battery) charged by the present system, "$Z_{rec}$" is an input impedance of a rectifier 301, and "$v_{rec}$" shows an input AC voltage to the rectifier 301. "$L_{r-TX}$" and "$L_{r-RX}$" are magnetically coupled based on the coupling coefficient k. Here, a mutual inductance M is expressed by the following formula (Expression 4)

$$M = k\sqrt{L_{r-TX} L_{r-RX}} \quad (4)$$

Figure 5B:
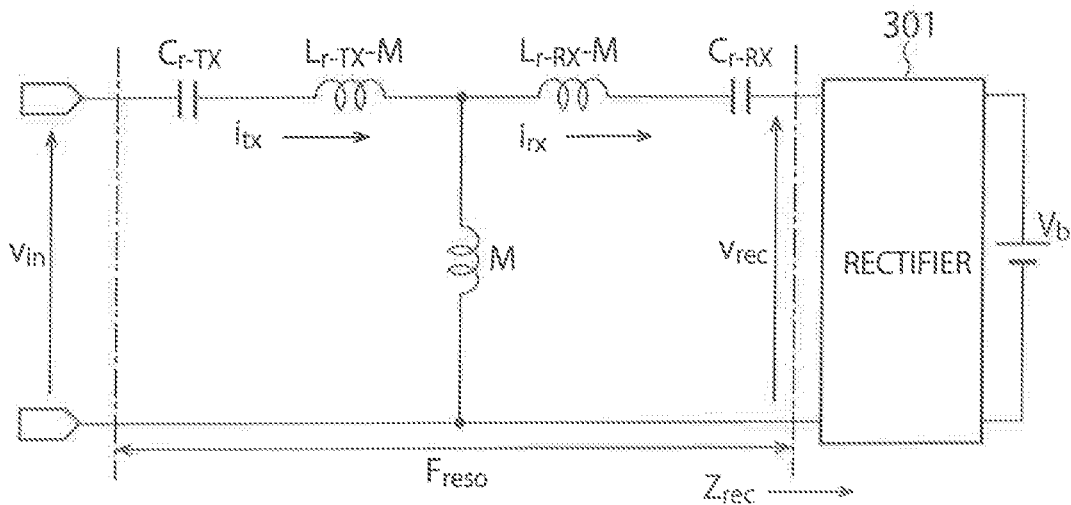

In FIG. 5(B), the circuit of FIG. 5(A) is replaced with a T-circuit using a mutual inductance. An F matrix $F_{reso}$ from an input terminal of the power transmission resonator to an output terminal of the power reception resonator is expressed as follows.

(Expression 5)

$$F_{reso} = \begin{bmatrix} 0 & -j\omega_0 M \\ \dfrac{1}{j\omega_0 M} & 0 \end{bmatrix} \quad (5)$$

Here, "$\omega_0$" is a resonance angular frequency expressed by $\omega_0 = 2\pi f_0$. Based on FIG. 5(B) and formula (5), "$i_{tx}$" and "$i_{rx}$" are expressed as follows.

(Expression 6)

$$i_{tx} = -j\frac{v_{rec}}{j\omega_0 M} \quad (6)$$

$$i_{rx} = \frac{v_{rec}}{Z_{rec}} \quad (7)$$

Furthermore, an inverse transfer function $v_{in}/v_{rec}$ is expressed as follows.

(Expression 7)

$$\frac{v_{in}}{v_{rec}} = -\frac{j\omega_0 M}{Z_{rec}} \quad (8)$$

Therefore, "$Z_{rec}$" is expressed as follows based on formula (8).

(Expression 8)

$$Z_{rec} = -\frac{j\omega_0 M}{v_{in}} v_{rec} \quad (9)$$

Here, when a voltage conversion ratio of the rectifier 301 is 1, the absolute value of "$v_{rec}$" is expressed as follows.

$$|v_{rec}| = |v_b| \quad (10)$$

Therefore, "$|i_{tx}|$" and "$|i_{rx}|$" are derived as follows based on formulas (7), (9), and (10).

(Expression 9)

$$|i_{tx}| = \left|\frac{V_b}{j\omega_0 M}\right| \quad (11)$$

$$|i_{rx}| = \left|\frac{v_{in}}{j\omega_0 M}\right| \quad (12)$$

Based on formulas (11) and (12), it can be checked that the absolute value $|i_{tx}|$ of the input current of the power transmission resonator and the output current $|i_{rx}|$ of the power reception resonator depend on the coupling coefficient k. Here, a high allowable amount of positional deviation is required for a system that charges a moving body such as a vehicle. However, when there are installation errors of the power transmission resonator and the power reception resonator, the difference between the coupling coefficient $k_1$ between the power transmission and reception resonators of one of the systems shown in FIG. 1 and the coupling coefficient $k_2$ between the power transmission and reception resonators of the other system increases with an increase in the positional deviation. Therefore, "$\Delta i_{trx}$" becomes large, and the canceling effect of the magnetic fields is reduced.

Here, to reduce "$\Delta i_{trx}$" even when there is a positional deviation due to an installation error, insertion of a ladder circuit (corresponding to the first circuit) between the inverter and the power transmission resonator and insertion of a ladder circuit (corresponding to the second circuit) between the power reception resonator and the rectifier will be examined.

Figure 6:
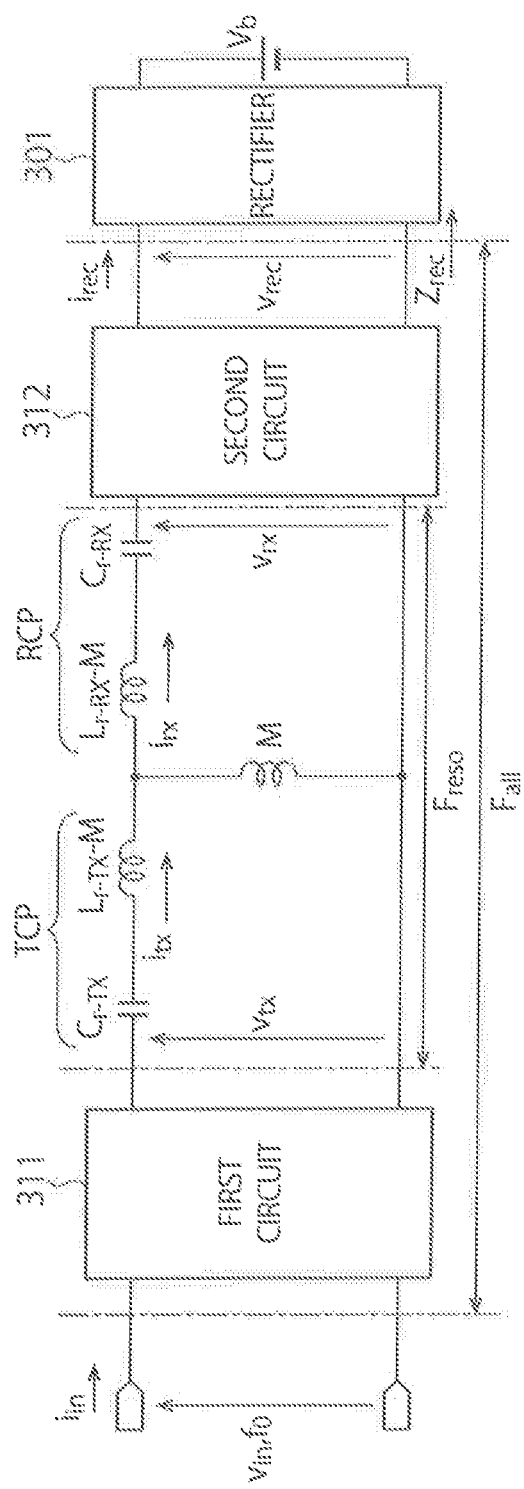
FIG. 6 is a schematic diagram of a wireless power transmission system in which a first circuit and a second circuit are inserted into the system of FIG. 5.

FIG. 6 shows a schematic diagram of a wireless power transmission system, in which the first circuit is inserted between the inverter and the power transmission resonator, and the second circuit is inserted between the power reception resonator and the rectifier in the system of FIG. 5(B).

"$F_{TLC}$" indicates an F matrix of a first circuit 311, "$F_{RLC}$" indicates an F matrix of a second circuit 312, and "$F_{all}$" indicates an F matrix from the inverter output terminal to the input terminal of the rectifier 301. "$F_{TLC}$", "$F_{RLC}$", and "$F_{all}$" are put as follows.

(Expression 10)

$$F_{TLC} = \begin{bmatrix} A_{TLC} & B_{TLC} \\ C_{TLC} & D_{TLC} \end{bmatrix} \quad (13)$$

$$F_{RLC} = \begin{bmatrix} A_{RLC} & B_{RLC} \\ C_{RLC} & D_{RLC} \end{bmatrix} \quad (14)$$

$$F_{all} = \begin{bmatrix} A_{all} & B_{all} \\ C_{all} & D_{all} \end{bmatrix} \quad (15)$$

Based on FIG. 6 and formulas (5) and (14), "$i_{tx}$" and "$i_{rx}$" are expressed as follows.

(Expression 11)

$$i_{tx} = \frac{v_{rx}}{j\omega_0 M} \quad (16)$$

$$i_{rx} = v_{rec} C_{RLC} + i_{rec} D_{RLC} \quad (17)$$

Furthermore, an input current $i_{rec}$ of the rectifier 301 is expressed as follows, (Expression 12)

$$i_{rec} = \frac{v_{rec}}{Z_{rec}} \quad (18)$$

and "$v_{rx}$" is expressed as follows based on formulas (14) and (18).

(Expression 13)

$$v_{rx} = v_{rec} A_{RLC} + \frac{v_{rec}}{Z_{rec}} B_{RLC} \quad (19)$$

In addition, a reverse voltage gain "$v_{in}/v_{rec}$" is expressed as follows, (Expression 14)

$$\frac{v_{in}}{v_{rec}} = A_{all} + \frac{B_{all}}{Z_{rec}} \quad (20)$$

and "$Z_{rec}$" is expressed as follows based on formula (20).

(Expression 15)

$$Z_{rec} = \frac{v_{rec} B_{all}}{v_{in} - A_{all} v_{rec}} \quad (21)$$

"$F_{all}$" is expressed as follows based on formulas (10), (13), and (14).

(Expression 16)

$$F_{all} = F_{TLC} \times F_{reso} \times F_{RLC} = \begin{bmatrix} \frac{A_{RLC} B_{TLC}}{j\omega_0 M} - \frac{B_{TLC} B_{RLC}}{j\omega_0 M} - \\ jA_{TLC} C_{BLC} \omega_0 M \quad jA_{TLC} D_{RLC} \omega_0 M \\ \frac{A_{RLC} D_{TRC}}{j\omega_0 M} - \frac{B_{TLC} D_{TLC}}{j\omega_0 M} - \\ jC_{TLC} C_{BLC} \omega_0 M \quad jC_{TLC} D_{RLC} \omega_0 M \end{bmatrix} \quad (22)$$

Therefore, "$i_{tx}$" and "$i_{rx}$" are expressed as follows based on formulas (16), (17), (18), (19), (21), and (22).

(Expression 17)

$$i_{tx} = \frac{v_{in} B_{RLC} - jv_{rec} \omega_0 M A_{TLC}(A_{RLC} D_{RLC} - B_{RLC} C_{RLC})}{B_{TLC} B_{RLC} + \omega_0^2 M^2 A_{TLC} D_{RLC}} \quad (23)$$

$$i_{rx} = \frac{v_{rec} B_{TLC}(A_{RLC} D_{RLC} - B_{RLC} C_{RLC}) - jv_{in} \omega_0 M D_{RLC}}{B_{TLC} B_{RLC} + \omega_0^2 M^2 A_{TLC} D_{RLC}} \quad (24)$$

Here, "β" is a ratio of the rectifier input voltage to the inverter output voltage and is provided by "$\beta = v_{rec}/v_{in}$".

Here, the following holds when the first circuit 311 and the second circuit 312 are passive elements.

$$A_{RLC} D_{RLC} - B_{RLC} C_{RLC} = 1 \quad (25)$$

Therefore, "$i_{tx}$" and "$i_{rx}$" are derived as follows based on formulas (23), (24), and (25).

(Expression 18)

$$i_{tx} = \frac{v_{in} B_{RLC} - jv_{rec} \omega_0 M A_{TLC}}{B_{TLC} B_{RLC} + \omega_0^2 M^2 A_{TLC} D_{RLC}} \quad (26)$$

$$i_{rx} = \frac{v_{rec} B_{TLC} - jv_{in} \omega_0 M D_{RLC}}{B_{TLC} B_{RLC} + \omega_0^2 M^2 A_{TLC} D_{RLC}} \quad (27)$$

Here, the coefficient of "M" is 0 when "$A_{TLC}$" and "$D_{RLC}$" are 0, and the following is derived based on formulas (10), (26), and (27).

(Expression 19)

$$|i_{tx}| = \left| \frac{v_{in}}{B_{TLC}} \right| \quad (28)$$

$$|i_{rx}| = \left| \frac{\beta V_b}{B_{RLC}} \right| \quad (29)$$

Based on formulas (28) and (29), it can be understood that the absolute values $|i_{tx}|$ and $|i_{rx}|$ of the currents of the power transmission resonator and the power reception resonator do not depend on the coupling coefficient k.

Therefore, if the conditions that "A" in the F matrix of each of the first circuits 105A and 105B is 0 (corresponding to the case in which "$A_{TLC}$" is 0 in the example of FIG. 6) and that "D" in the F matrix of each of the second circuits 202A and 202B is 0 (corresponding to the case in which "$A_{RLC}$" is 0 in the example of FIG. 6) are satisfied in the configuration of FIG. 1, the currents flowing through the power transmission resonator and the power reception resonator can be equalized between the two systems just by setting the step-up/step-down ratios of the rectifiers 203A and 203B of the inverters 104A and 104B of the two power transmission systems to the same value and setting the step-up/step-down ratios of the two power reception systems to the same value. As a result, the control of charging is significantly simplified.

Although "$A_{TLC}$" and "$D_{RLC}$" are 0 in formulas (26) and (27) in the case described in the example, the absolute values $|i_{tx}|$ and $|i_{rx}|$ of the power transmission resonator current and the power reception resonator current can be less dependent on the coupling coefficient k if "$A_{TLC}$" and "$D_{RLC}$" are less than 1. The closer the values are to 0, the more the dependence on the coupling coefficient k can be reduced.

More specifically, a state in which the first circuit 311 and the second circuit 312 are eliminated, the power transmission resonator is directly connected to the input terminal through wiring, and the power reception resonator is directly connected to the rectifier 301 through wiring in the example of FIG. 6 will be considered. That is, a system without the first circuit and the second circuit will be considered. In this case, the following holds.

$A_{TLC} = A_{RLC} = 1$
$B_{TLC} = B_{RLC} = 0$
$C_{TLC} = C_{RLC} = 0$
$D_{TLC} = D_{RLC} = 1$

Therefore, providing the first circuit in which "$A_{TLC}$" is smaller than 1 on the power transmission side and providing the second circuit in which "$D_{RLC}$" is smaller than 1 on the power reception side can obtain the advantageous effect of the present embodiment (reducing the dependence on the coupling coefficient k) as compared to the wireless power transmission system without the first circuit and the second circuit.

Figure 7:
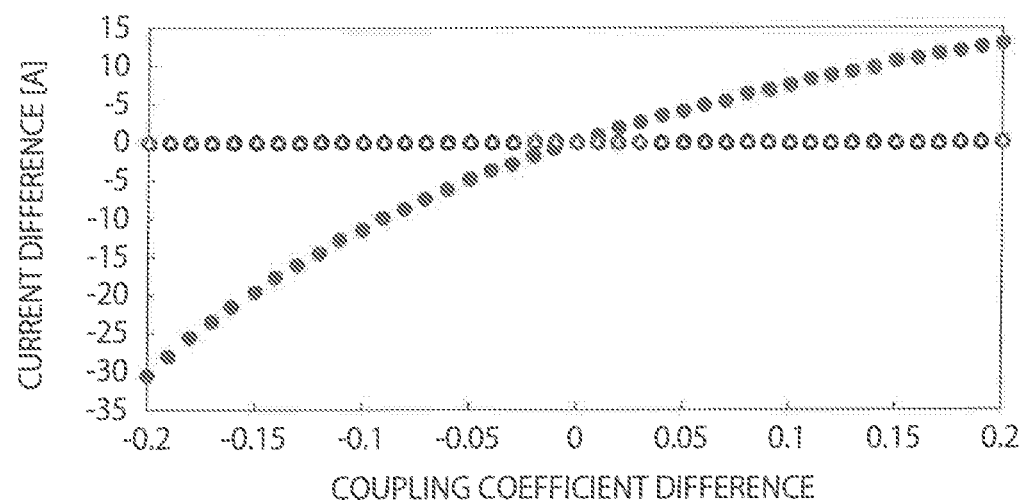
FIG. 7 is a diagram showing simulation results describing an advantageous effect of the first embodiment.

The advantageous effect of the present embodiment will be described in comparison with a related art. FIG. 7 shows simulation results describing the advantageous effect of the present embodiment. A configuration excluding the first circuits 105A, 105B, 202A, and 202B from the configuration of FIG. 1 will be used as the related art. The step-up/step-down ratios of the DC/DC converters 103A and 104B on the power transmission side are the same (output voltages are the same or substantially the same), and the step-up/step-down ratios of the DC/DC converters 204A and 204B on the power reception side are the same. The values of the parameters "A" in the F matrix of the first circuits 105A and 105B are 0, and the values of the parameters "D" in the F matrix of the second circuits 202A and 202B are 0.

A current difference between the power transmission resonators 106A and 106B and a current difference between the power reception resonators 201A and 201B when there is a difference of −0.2 to 0.2 between the coupling coefficient k1 of the resonator pair A (pair of the power transmission resonator 106A and the power reception resonator 201A) and the coupling coefficient k2 of the resonator pair B (pair of the power transmission resonator 106B and the power reception resonator 201B) are calculated, and FIG. 7 shows the results. Simulation software SPICE (Simulation Program with Integrated Circuit Emphasis) is used for the calculation.

According to FIG. 7, the currents of the power transmission resonators 106A and 106B are substantially constant, and the currents of the power reception resonators 201A and 201B are substantially constant even if there is a difference between the coupling coefficients of the resonator pair A and the resonator pair B in the wireless power transmission system provided with the first circuits 105A, 105B, 202A, and 202B according to the present embodiment. Therefore, the DC/DC converters 103A and 103B on the power transmission side can have common step-up/step-down ratios, and the DC/DC converters 204A and 204B on the power reception side can also have common step-up/step-down ratios. Therefore, control variables can be reduced, and the leakage magnetic field can be reduced with a simple configuration.

Second Embodiment

Figure 8:
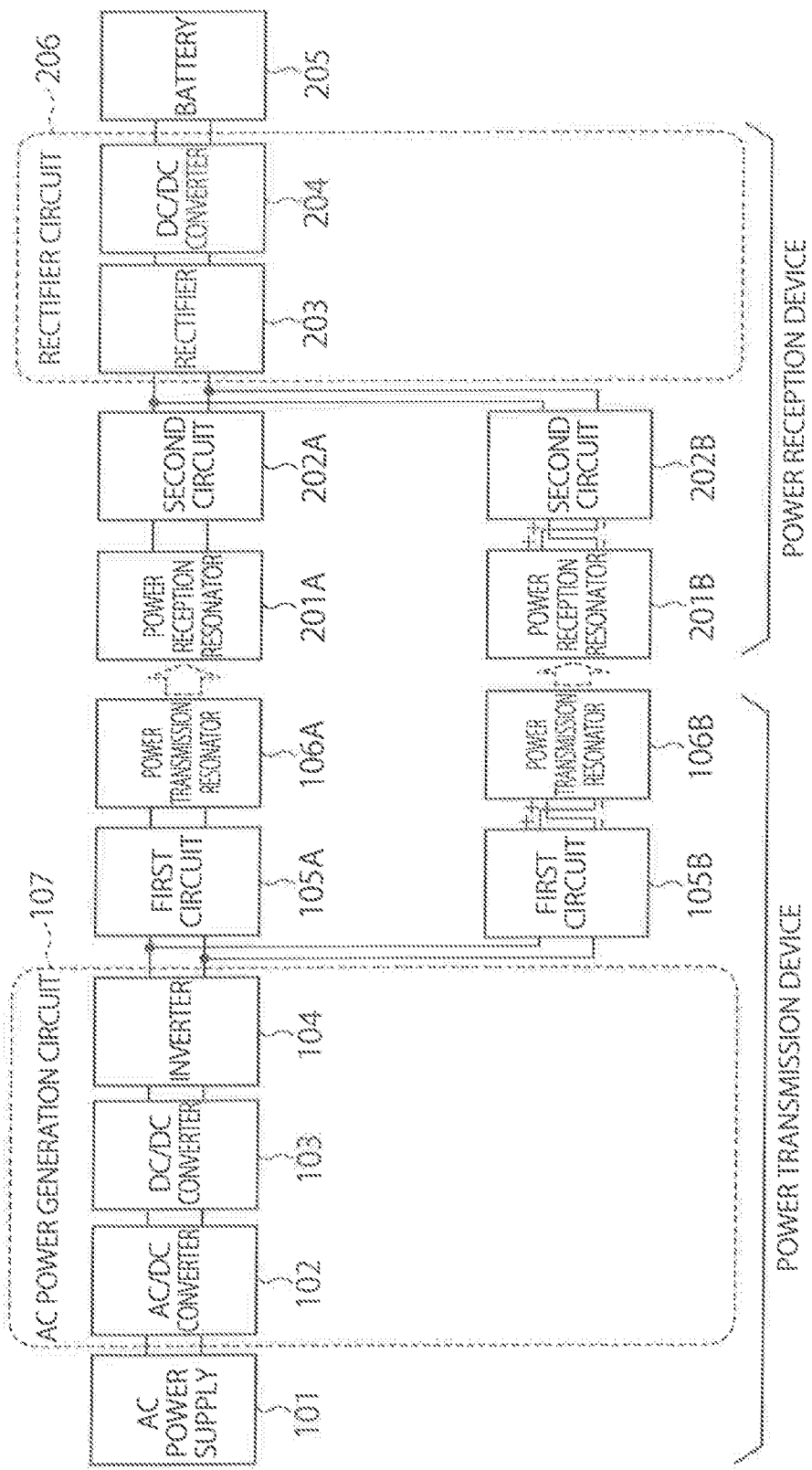
FIG. 8 is a diagram showing an overall configuration of a wireless power transmission system according to a second embodiment.

FIG. 8 shows an overall configuration of a wireless power transmission system according to the present embodiment. The same reference signs are provided to the same or corresponding elements in FIG. 1, and the description will not be repeated.

Although the DC/DC converter and the inverter are provided to each of the two power transmission systems in the first embodiment, a common DC/DC converter 103 and a common inverter 104 are provided for the two power transmission systems in the present embodiment. One of the two power transmission systems corresponds to the set of the first circuit 105A and the power transmission resonator 106A, and the other power transmission system corresponds to the set of the first circuit 105B and the power transmission resonator 106B.

The connection of two input terminals (positive terminal and negative terminal) of the power transmission resonator 106B with respect to the first circuit 105B is opposite the connection in FIG. 1 so that the currents of the power transmission resonators 106A and 106B are in reverse phase.

Although the rectifier and the DC/DC converter are provided to each of the two power reception systems in the first embodiment, a common rectifier 203 and a common DC/DC converter 204 are provided for the two power reception systems in the present embodiment. One of the two power reception systems corresponds to the set of the power reception resonator 201A and the second circuit 202A, and the other power reception system corresponds to the set of the power reception resonator 201B and the second circuit 202B. The connection of two output terminals (positive terminal and negative terminal) of the power reception resonator 201B with respect to the second circuit 202B is opposite the connection in FIG. 1 so that the phases of the currents input from the two power reception systems to the rectifier 203 are in phase.

As in the first embodiment, the constants of the plurality of elements are set in the first circuits 105A and 105B such that the absolute values of the open-circuit output reverse voltage gains A in the F matrices of the first circuits 105A and 105B are less than 1. For example, the values of "A" are 0 in both circuits. As in the first embodiment, the constants of the plurality of elements are also set in the second circuits 202A and 202B such that the absolute values of the short-circuit output reverse current gains D in the F matrices of the second circuits 202A and 202B are less than 1. For example, the values of "D" are 0 in both circuits.

According to the configuration, the amplitudes of the power transmission currents of the two power transmission systems can be the same or close to each other, and the amplitudes of the power reception currents of the two power reception systems can be the same or close to each other with a simple configuration, regardless of the difference between the coupling coefficients of the resonator pairs. This can reduce the strength of the leakage magnetic field.

Figure 9:
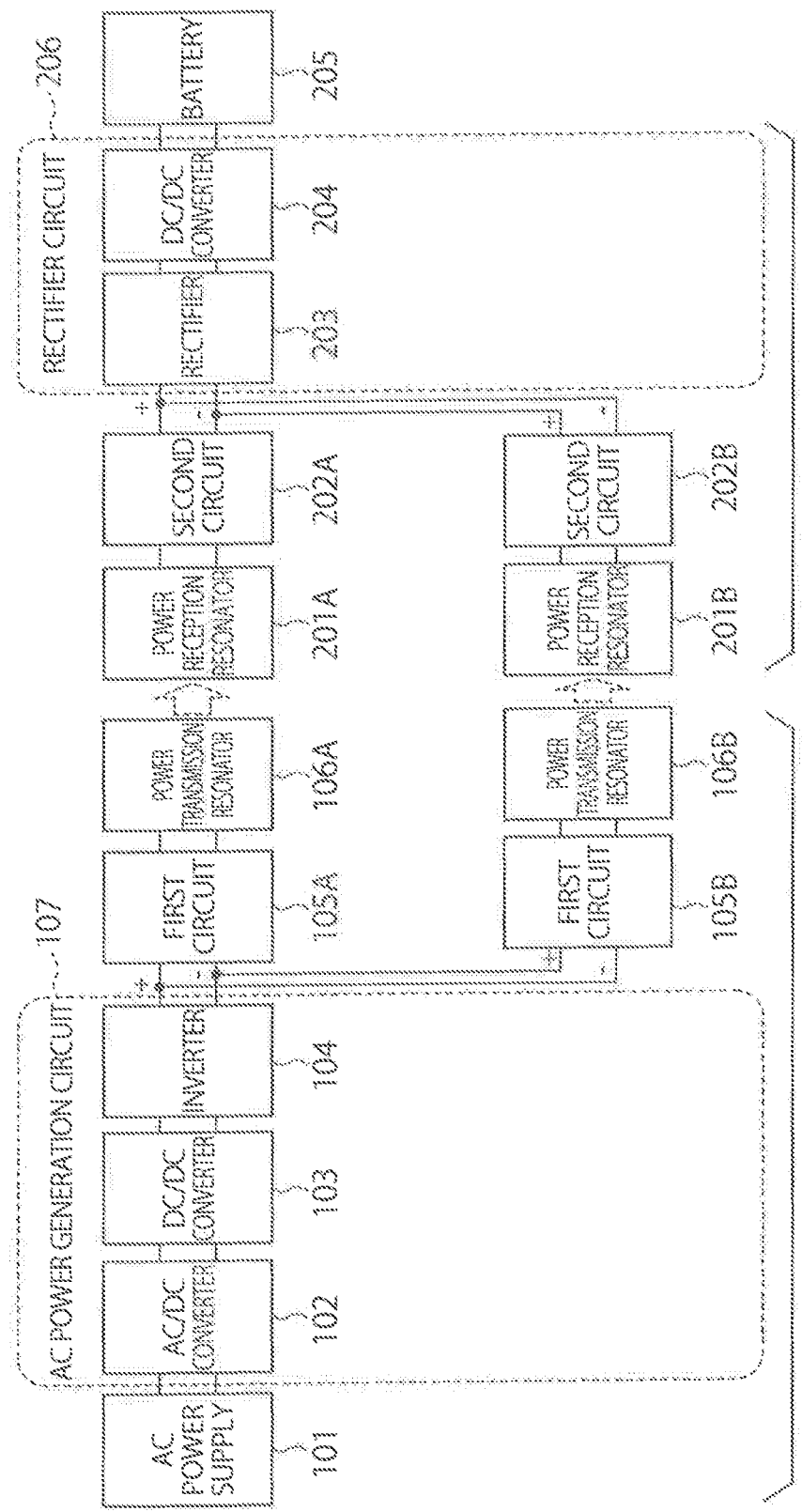
FIG. 9 is a diagram showing another example of the overall configuration of the wireless power transmission system according to the second embodiment.

FIG. 9 shows another example of the overall configuration of the wireless power transmission system according to the present embodiment. Differences from FIG. 8 will be described. The positive terminal on the input side of the first circuit 105B on the power transmission side is electrically connected to the negative terminal on the output side of the inverter 104, and the negative terminal on the input side of the first circuit 105B on the power transmission side is electrically connected to the positive terminal on the output side of the inverter 104. As a result, the phase of the current input to the first circuit 105B is reversed from the phase of the current input to the first circuit 105A.

The positive terminal on the output side of the second circuit 202B on the power reception side is electrically connected to the negative terminal on the input side of the rectifier 203, and the negative terminal on the output side of the second circuit 202B is electrically connected to the positive terminal on the input side of the rectifier 203. As a result, the current output from the second circuit 202B is in phase with the current output from the second circuit 202A. The advantageous effect of the present configuration is the same as in FIG. 8, and the description will not be repeated.

Third Embodiment

Figure 10:
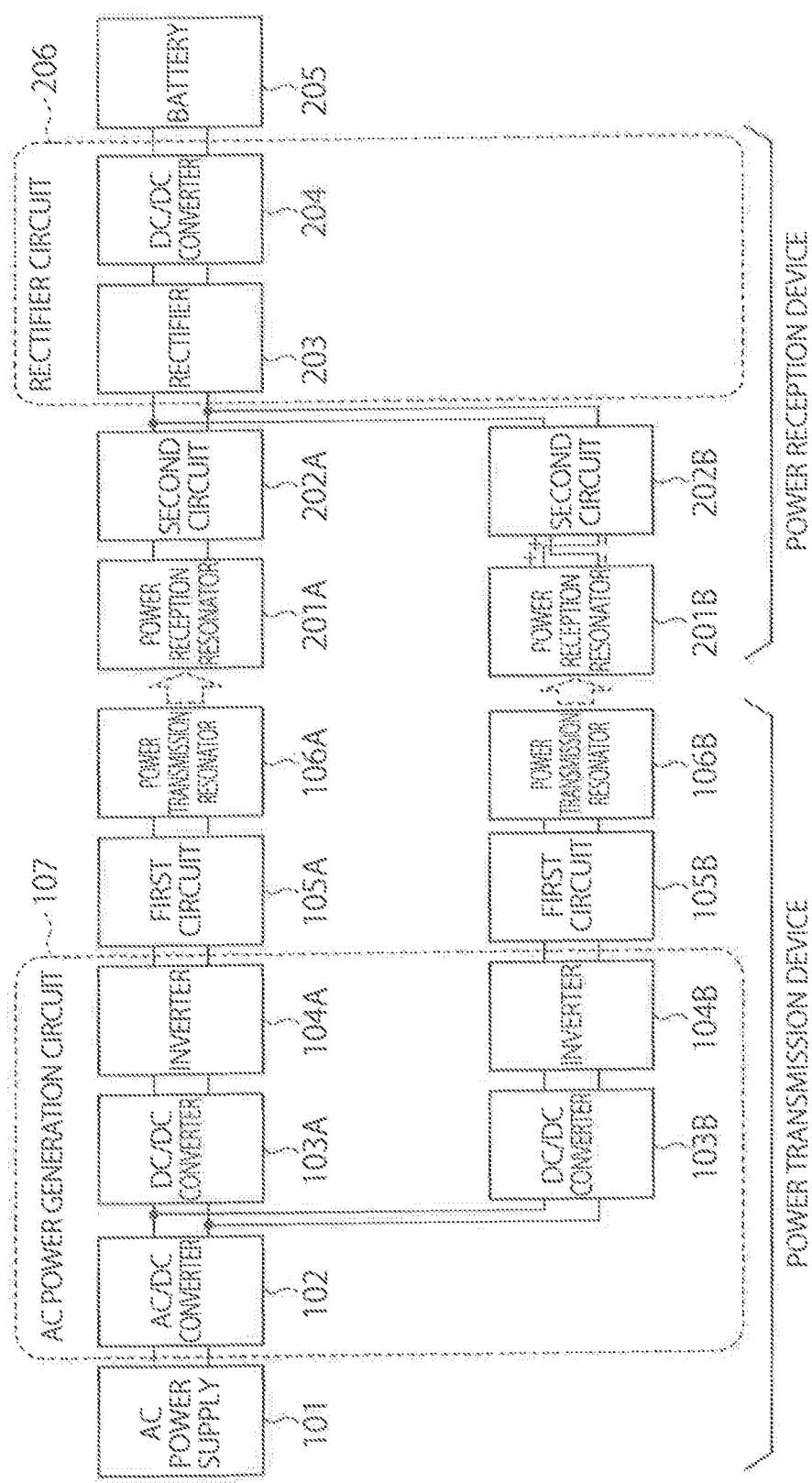
FIG. 10 is a diagram showing an overall configuration of a wireless power transmission system according to a third embodiment.

FIG. 10 shows an overall configuration of a wireless power transmission system according to the present embodiment. The configuration of the power transmission device is the same as in FIG. 1 of the first embodiment. The configuration of the power reception device is the same as in FIG. 8 of the second embodiment. The conditions regarding the parameter "A" in the F matrix of each of the first circuits 105A and 105B on the power transmission side and the conditions regarding the parameter "D" in the F matrix of each of the second circuits 202A and 202B on the power reception side are also the same.

According to the configuration, the same advantageous effect as in the first embodiment can also be obtained. More specifically, the amplitudes of the power transmission currents of the two power transmission systems can be the same or close to each other with a simple configuration, regardless of the difference between the coupling coefficients of the resonator pairs. Therefore, the strength of the leakage magnetic field can be reduced by simple control regardless of the difference between the coupling coefficients of the resonator pairs.

Figure 11:
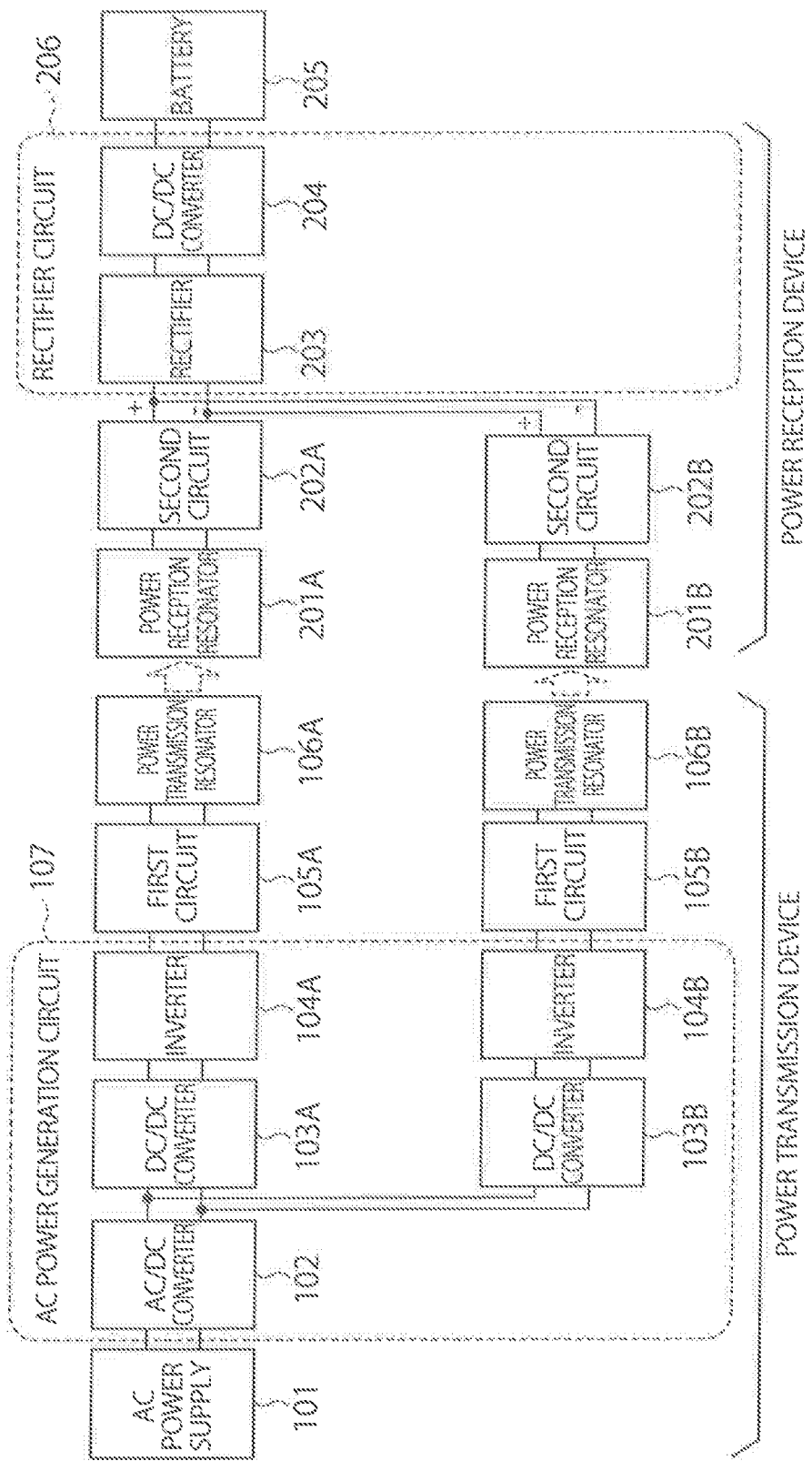
FIG. 11 is a diagram showing another example of the overall configuration of the wireless power transmission system according to the third embodiment.

FIG. 11 shows another example of the overall configuration of the wireless power transmission system according to the present embodiment. The configuration of the power transmission device is the same as in the first embodiment. The configuration of the power reception device is the same as in FIG. 9 of the second embodiment. The advantageous effect of the present configuration is the same as in FIG. 10, and the description will not be repeated.

Fourth Embodiment

Figure 12:
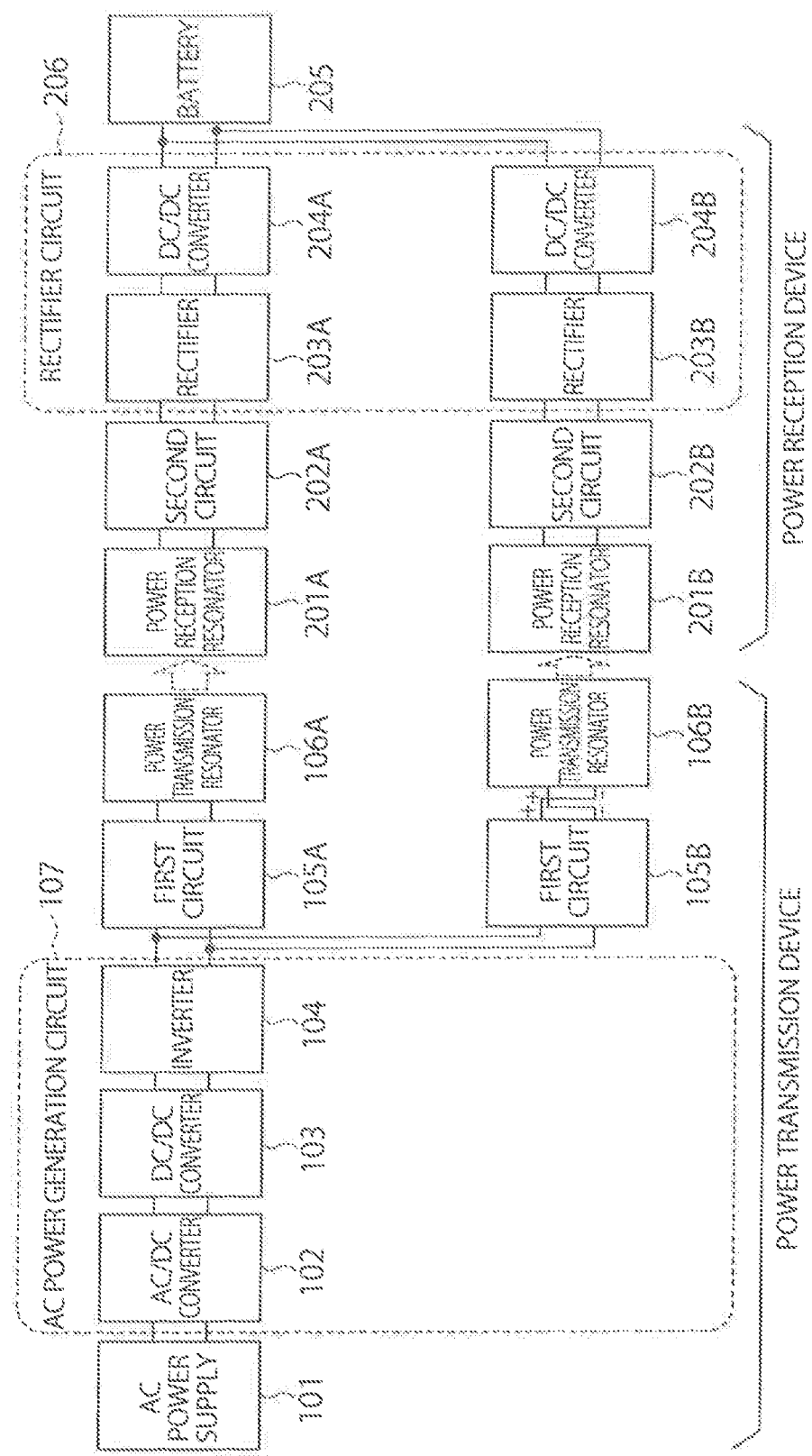
FIG. 12 is a diagram showing an overall configuration of a wireless power transmission system according to a fourth embodiment.

FIG. 12 shows an overall configuration of a wireless power transmission system according to the present embodiment. The configuration of the power transmission device is the same as in FIG. 8 of the second embodiment. The configuration of the power reception device is the same as in FIG. 1 of the first embodiment. The conditions regarding the parameter "A" of the F matrix of each of the first circuits 105A and 105B on the power transmission side and the conditions regarding the parameter "D" of the F matrix of each of the second circuits 202A and 202B on the power reception side are also the same.

According to the configuration, the amplitudes of the power reception currents of the two power reception systems can be the same or close to each other with a simple configuration, regardless of the difference between the coupling coefficients of the resonator pairs. This can reduce the strength of the leakage magnetic field.

Figure 13:
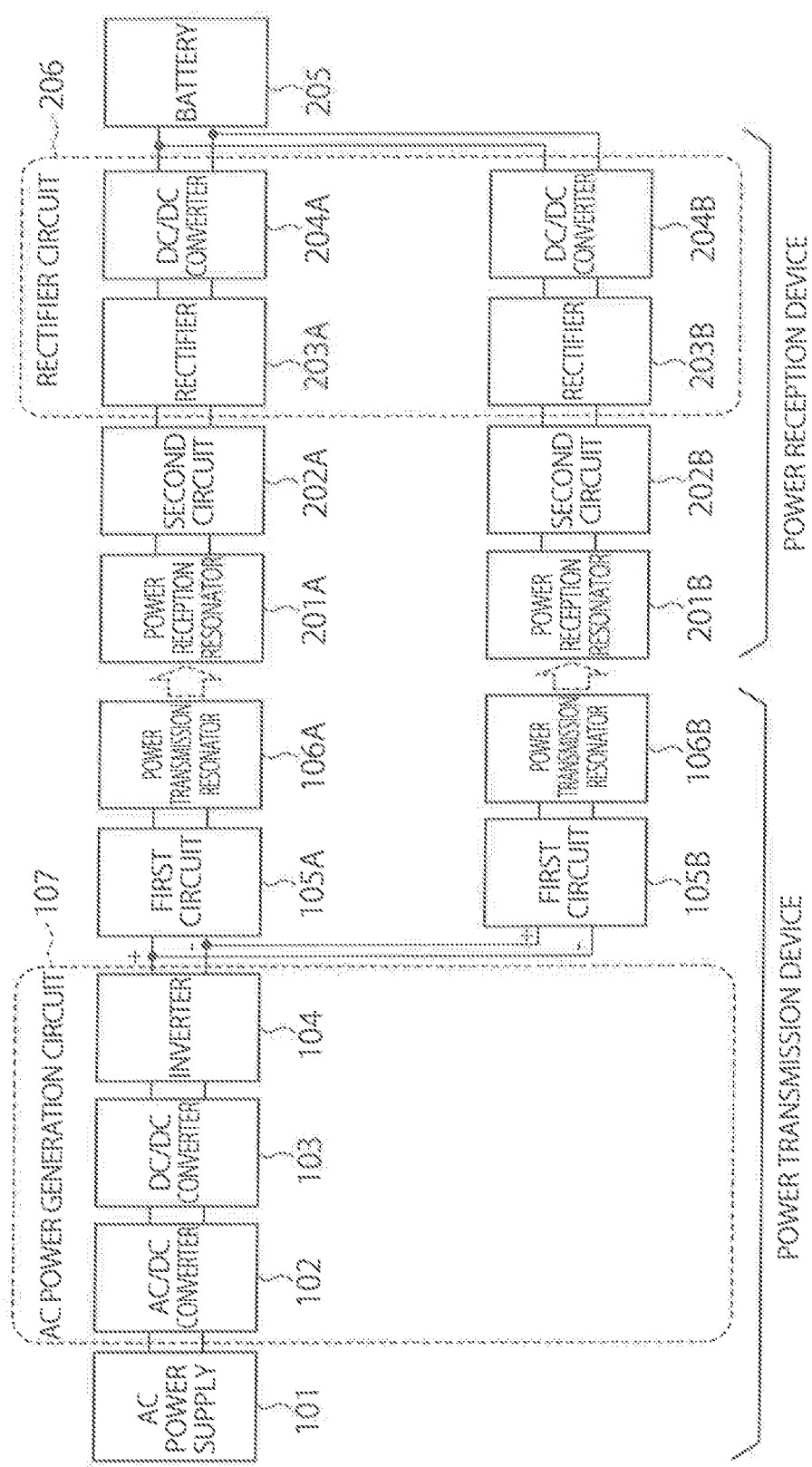
FIG. 13 is a diagram showing another example of the overall configuration of the wireless power transmission system according to the fourth embodiment.

FIG. 13 shows another example of the overall configuration of the wireless power transmission system according to the present embodiment. The configuration of the power transmission device is the same as in FIG. 9 of the second embodiment. The configuration of the power reception device is the same as in FIG. 1 of the first embodiment. The advantageous effect of the present configuration is the same as in FIG. 12, and the description will not be repeated.

Other Embodiments

The number of power transmission systems is two in the embodiments described above. The number of power reception systems is also two. However, the number of power transmission systems may be three or more in the embodiments. The number of power reception systems may also be three or more. In this case, the first circuit is also arranged on each power transmission system, and the second circuit is also arranged on each power reception system. The phase relationship between the power transmission currents of the power transmission systems can be adjusted according to the number of power transmission systems. For example, when the number of power transmission systems is three, the inverter of each power transmission system can generate the AC current such that the phases of three power transmission systems are different from each other by 120 degrees. When the number of power transmission systems is N, the number of first circuits is also N, and the currents of AC power supplied from the AC power generation circuit 107 (FIG. 1) to the plurality of first circuits are AC currents with phases shifted from each other by 360/N degrees. In this way, the same advantageous effect as in the first to fourth embodiments can also be obtained when there are three or more systems. Therefore, the wireless power transmission system that cancels out, at a distant place, the magnetic fields radiated from the power transmission systems can be realized by a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless power transmission system comprising:
a power transmission device comprising:
an AC power generation circuit configured to generate AC currents;
a plurality of first circuits connected to the AC power generation circuit; and
a plurality of power transmission resonators each connected to different one of the plurality of first circuits and configured to generate magnetic fields based on the AC currents received through the plurality of first circuits; and
a power reception device comprising:
a plurality of power reception resonators configured to receive AC power through magnetic field coupling to the plurality of power transmission resonators;
a plurality of second circuits each connected to different one of the plurality of power reception resonators; and
a rectifier circuit connected to the plurality of second circuits and configured to convert voltages of the AC power received through the plurality of second circuits to DC voltages, wherein:
phases of the AC currents generated by the AC power generation circuit are shifted from each other,
the plurality of first circuits each has a first ABCD-parameters including a parameter A, a parameter B, a parameter C and a parameter D, and
the plurality of second circuits each has a second ABCD-parameters including a parameter A, a parameter B, a parameter C and a parameter D, wherein:
the parameter A is an open-circuit output reverse voltage gain,
the parameter B is a short-circuit output transfer impedance,
the parameter C is an open output transfer admittance,
the parameter D is a short-circuit output reverse current gain,
an absolute value of the parameter A of the first ABCD-parameters of each of the plurality of first circuits is less than 1,
an absolute value of the parameter D of the second ABCD-parameters of each of the plurality of second circuits is less than 1, and
a difference of amplitudes of the AC currents in the power transmission resonators is suppressed even when a difference of coupling coefficients between the power transmission resonators and the power reception resonators varies.

2. The wireless power transmission system according to claim 1, wherein
the AC power generation circuit comprises: an AC/DC converter configured to convert an AC voltage supplied by an AC power supply to a DC voltage; a plurality of DC/DC converters configured to convert the DC voltage to different DC voltages; and a plurality of inverters configured to generate the AC currents based on the DC voltages converted by the plurality of DC/DC converters, and
voltage conversion ratios of the plurality of DC/DC converters are same.

3. The wireless power transmission system according to claim 1, wherein
the rectifier circuit comprises: a plurality of rectifiers configured to convert the voltages of the AC power to the DC voltages; and a plurality of DC/DC converters configured to convert the voltages converted by the plurality of rectifiers to different DC voltages, wherein
voltage conversion ratios of the plurality of DC/DC converters are the same.

4. The wireless power transmission system according to claim 1, wherein
each of the plurality of first circuits comprises: a plurality of inductive elements connected in series; and a capacitive element with one end connected between adjacent inductive elements.

5. The wireless power transmission system according to claim 1, wherein
each of the plurality of second circuits includes: a plurality of inductive elements connected in series; and a capacitive element with one end connected between adjacent inductive elements.

6. The wireless power transmission system according to claim 1, wherein
each of the plurality of first circuits comprises: a plurality of capacitive elements connected in series; and an inductive element with one end connected between adjacent capacitive elements.

7. The wireless transmission system according to claim 1, wherein
each of the plurality of second circuits comprises: a plurality of capacitive elements connected in series; and an inductive element with one end connected between adjacent capacitive elements.

8. The wireless power transmission system according to claim 1, wherein
the absolute value of the parameter A in the first ABCD-parameters of each of the plurality of first circuits is 0, and the absolute value of the parameter D in the second ABCD-parameters of each of the plurality of second circuits is 0.

9. The wireless power transmission system according to claim 1, wherein
the number of the plurality of first circuits is N, and
the phases of the AC currents generated by the AC power generation circuit are shifted from each other by 360/N degrees.

* * * * *